United States Patent

[11] 3,609,311

[72] Inventor Ronald G. Wayne
Canoga Park, Calif.

[21] Appl. No. 827,690
[22] Filed May 26, 1969
[45] Patented Sept. 28, 1971
[73] Assignee Centaur Mini Computer Devices Inc.
New York, N.Y.

[54] COINCIDENT COUNTING SYSTEM
6 Claims, 4 Drawing Figs.

[52] U.S. Cl. .......................................................... 235/92 NG,
235/92 R, 235/92 PE, 328/43, 328/48, 307/223
[51] Int. Cl. ............................................................ H03k 21/36,
H03k 23/02
[50] Field of Search ............................................ 235/92
(63), 92 (67), 92 (27); 307/223; 328/43, 48

[56] References Cited

UNITED STATES PATENTS

| | | | |
|---|---|---|---|
| 3,432,684 | 3/1969 | Michael et al. ............... | 307/223 |
| 3,443,070 | 5/1969 | Derby et al. .................. | 235/92 |

*Primary Examiner*—Maynard R. Wilbur
*Assistant Examiner*—Joseph M. Thesz, Jr.
*Attorney*—Robert E. Geauque

ABSTRACT: A coincident counting system is described which comprises a plurality of ring counters, each ring counter having dissimilar number of bit stages. Each initial bit stage of each ring counter is only coincident on each full cycle of operation, thereby indicating maximum count. By proper selection logic, coincidence of each bit in each register may be selected to vary the count. A single input switch increments all ring counters simultaneously until selected coincidence occurs.

INVENTOR.
RONALD G. WAYNE,
BY R. E. Geauque
ATTORNEY.

COINCIDENT COUNTING SYSTEM

BACKGROUND OF THE INVENTION:

1. Field of the Invention

This invention relates to counting systems, and more particularly to a novel and improved coincident counting system adapted to cycle until elected bit stages are coincident, or the like.

2. Discussion of the Prior Art

In the prior art, counting systems have found widespread use in computer systems, parts counting, and numerous other commercial fields employing digital techniques. Presently, the most commonly known counters are ring counters, shift registers and binary counters. Ring counters and shift registers are quite acceptable for their limited use, but are normally limited in count by the number of bit stages in the counters. Other type counting systems with an increased count employ more than one ring counter or shift resister which increments the second shift register each time the first shift register is full, or completes a counting cycle. Again, in these prior art devices, the counts are normally quite limited. These type counters are sometimes known as decade counters. Binary counters are also limited in their count in that each counter registers a single binary digit, and each binary counter is comprised of complex circuitry, such as flip-flops and enabling stages.

SUMMARY

Briefly described, the present embodiment comprises a plurality of counters, each including an incrementing input, each counter in the plurality having a dissimilar number of bit stages. Means are included and are coupled to the incrementing inputs of the counters for incrementing all of the counters of said plurality simultaneously. Gating means are included and are coupled to said selected bit stages of said counters for indicating coincidence of selected bit stages after a predetermined count.

In principle, a coincident counter of the embodiment described is a counting system in which all digits are made to progress simultaneously. For proper operation, such a counter must have a dissimilar number of bits in each column so that all columns register the same corresponding bit or experience coincidence only once in a full cycle of operation. Since the columns have a dissimilar number of bits, they cannot be referred to as decades. So, for the purpose of this discussion, they will be referred to herein as multicades. Each multicade is a counter of N number of bits. An array of two or more multicades, each having a number of bits differing from any other number in the array, makes up a single counting system.

DESCRIPTION OF THE DRAWINGS

There and other features and advantages will become more apparent to those skilled in the art when taken into consideration with the following detailed description, wherein like reference numerals indicate like and corresponding parts throughout the several views and wherein.

DESCRIPTION OF A PREFERRED EMBODIMENT

Figure 1:
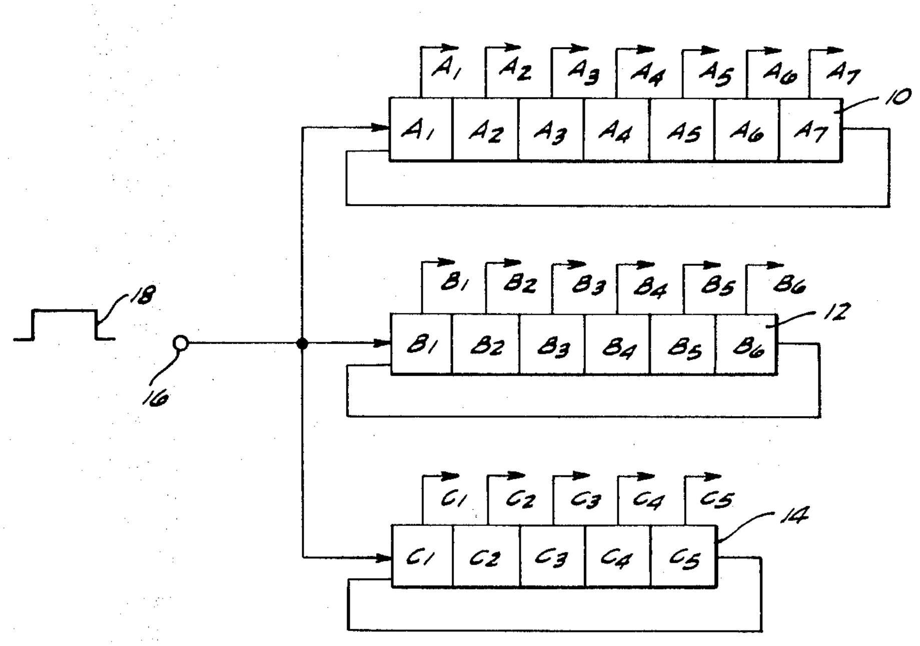
FIG. 1 is a logic diagram illustrating the coincident counting system of this invention.

Turning now to FIG. 1, there is shown an embodiment of a coincident counter of this invention which comprises three ring counters 10, 12 and 14. An input terminal 16 is coupled into each ring counter 10, 12 and 14 and is adapted to receive a sequencing pulse 18 thereon. The ring counter 10 comprises a plurality of bit stages A1–A7, each of which has an output denoted as A1–A7, accordingly. The outputs of the bit stages are sequentially enabled by pulses applied to the input terminal 16, that is, A1 comes on at a first pulse A2 comes on at a second pulse, and A1 goes off simultaneously. This sequence continues until A7 is enabled. Thereafter, the next pulse 18 receives a terminal 16 and will again enable A1 such that each bit stage of the counter 10 is successively enabled until the end bit stage is enabled, and thereafter starts over again.

The ring counter 12 comprises a plurality of bit stages B1–B6 and provides outputs denoted as B1–B6, accordingly, and operates in the same manner as ring counter 10.

FInally, for this embodiment, ring counter 14 is provided with five bit stages C1–C5 and provides outputs C1–C5, accordingly, and ring counter 14 operates in a similar fashion as ring counters 10 and 12. It is important to note that ring counter 10 has seven bit stages; ring counter 12 has six bit stages, and ring counter 14 has five bit stages.

The initial bit stage A1, B1 and C1 of each ring counter 10, 12 and 14 are enabled simultaneously by the pulse 18 being applied to the input terminal 16. Because the product of 5,6 and 7 is 210 thus the product of the final count of ring counter 10, 12 and 14 will provide a count of 210 at the end of a complete cycle. The product of the number of bits of each ring counter 10, 12 and 14 provided in a system of this invention defines the range of the counting system. When any pulse 18 is applied to the count input terminal 16 of the counting system, it is fed to all multicades 10, 12 and 14 simultaneously, causing all three ring counters to shift one digit at a time. If it is established on a arbitrary basis that the first bit position (A1, B1 and C1) in each multicade is the "full register" point and counting begins from this reference, it will be noted that it takes 210 pulses at the input terminal 16 before all of three multicades, counters 10, 12 and 14, again return to the initial bit position (A1, B1 and C1) simultaneously.

Since conventional decade counters receive input pulses only at on initial counter and when this counter is full it then sequences adjacent ring counters at appropriate intervals, they are referred to as sequential counters. Since in the device of the present invention, each multicade is operated simultaneously to and independent of all other multicades in the array and must activate corresponding bits to note full register, it can be termed a coincident counter.

Figure 2:
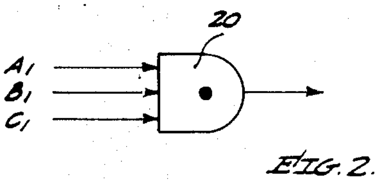
FIG. 2 is a logic diagram illustrating one coincident position of selected bit registers.

FIG. 2 illustrates a typical AND gate 20 which is enabled by the terms A1, B1, and C1 from the initial stages of the multicade counters 10, 12 and 14. If such inputs were provided to the AND gate 20 from the counting system of FIG. 1, an output on the AND gate 20 would indicate full register, and in this particular embodiment, the full register would be a count of 210 pulses at the input terminal 16. To provide for different or varied numbers of counts, different coincident gates, such as the AND gate 20, may be coupled to different bit stages of the counters 10, 12, and 14 for various other counts. for example if it is desired to establish a second and separate register point at, for example, 125 counts beyond the normal full register point of A1, B1, C1, the following procedure is used; since multicade 10 is a seven bit ring, divide 125 by 7 and determine the remainder —which is 6, to which we add 1. Thus, at 125 counts, multicade 10 would be active in bit A7. Multicade 12 is a six bit ring. Divide 125 by 6 to determine the remainder, 5; add 1 and we find that at 125 counts beyond the normal full register, bit B6 is active. Multicade 14 is a five bit ring, 125 divided by 5 yields a remainder of "0"; plus 1 shows bit C1 to be active after 125 counts. Thus, from the above determination it is seen that starting from the normal full register point, A1, B1, C1, 125 counts would yield a resultant active code for multicades 10, 12 and 14 of A7, B6 and C1, respectively.

In the event it is desirous only to meter and control a predetermined number of external events, wherein a predetermined number is always the only determination needed, multicades are selected with the desired amount of bit stages, for example, a device similar to the one shown in FIG. 1. If it is desired that at each count interval it is necessary to count only 210 parts before a restart or reset is initiated, a single AND gate is all that is necessary, similar to the one shown in FIG. 2. For example, in a coil winding machine to preset and automatically limit the high-speed winding of wire to a preset number of turns, or to count out parts for automatic packaging, or to establish the intervals of a digital clock of precise increments may be considered a few of the many varied applications. Selector switch or diode matrix coding provides a convenient means for setting the counter array for N number of counts before a full register is achieved. Thus, any number of counts thus coded from one to one less the full range of the system may be used.

Figure 3:
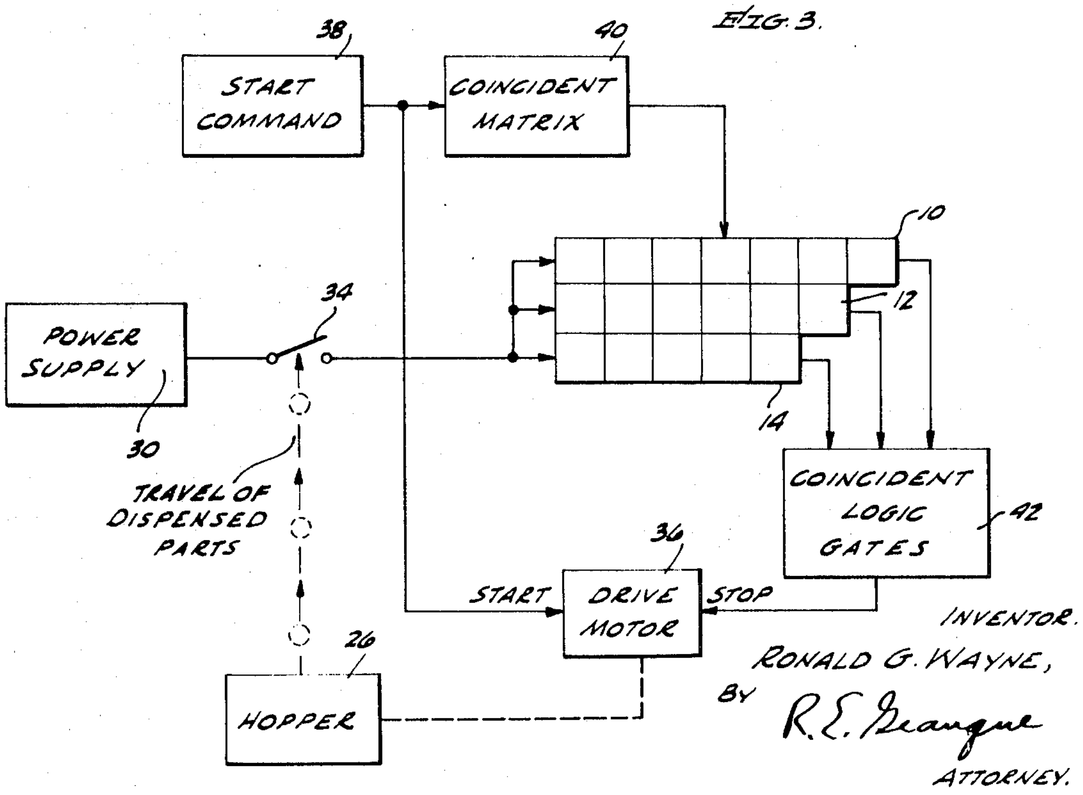
FIG. 3 illustrates a parts counting system using the coincident counters of this invention.

Referring now to FIG. 3, there is shown a system which is useful in counting particular parts provided by a hopper 26. A power supply 30 is coupled through a switch 34 to the terminals 16 of the counting system comprising the ring counters 10, 12 and 14. As parts are provided by the hopper 26, each one can be adapted to close the switch 34 in a suitable manner. The hopper 26 is driven by a drive motor 36 which is enabled by a start command 38. The start command 38 also enables a coincident matrix 40 which selects the number of count by enabling certain bit stages in the ring counters 10, 12 and 14 which are then coupled to coincident logic gates 42. As the parts provided by the hopper 26 energize the switch 34, the ring counters are sequentially enabled as in the manner previously set forth. When the selected bit stages, as set by the coincident matrix 40, are coincident, as provided by the coincident logic gates 42, a stop command is provided to the drive motor 36 and the hopper than stops feeding parts by the switch 34.

Figure 4:
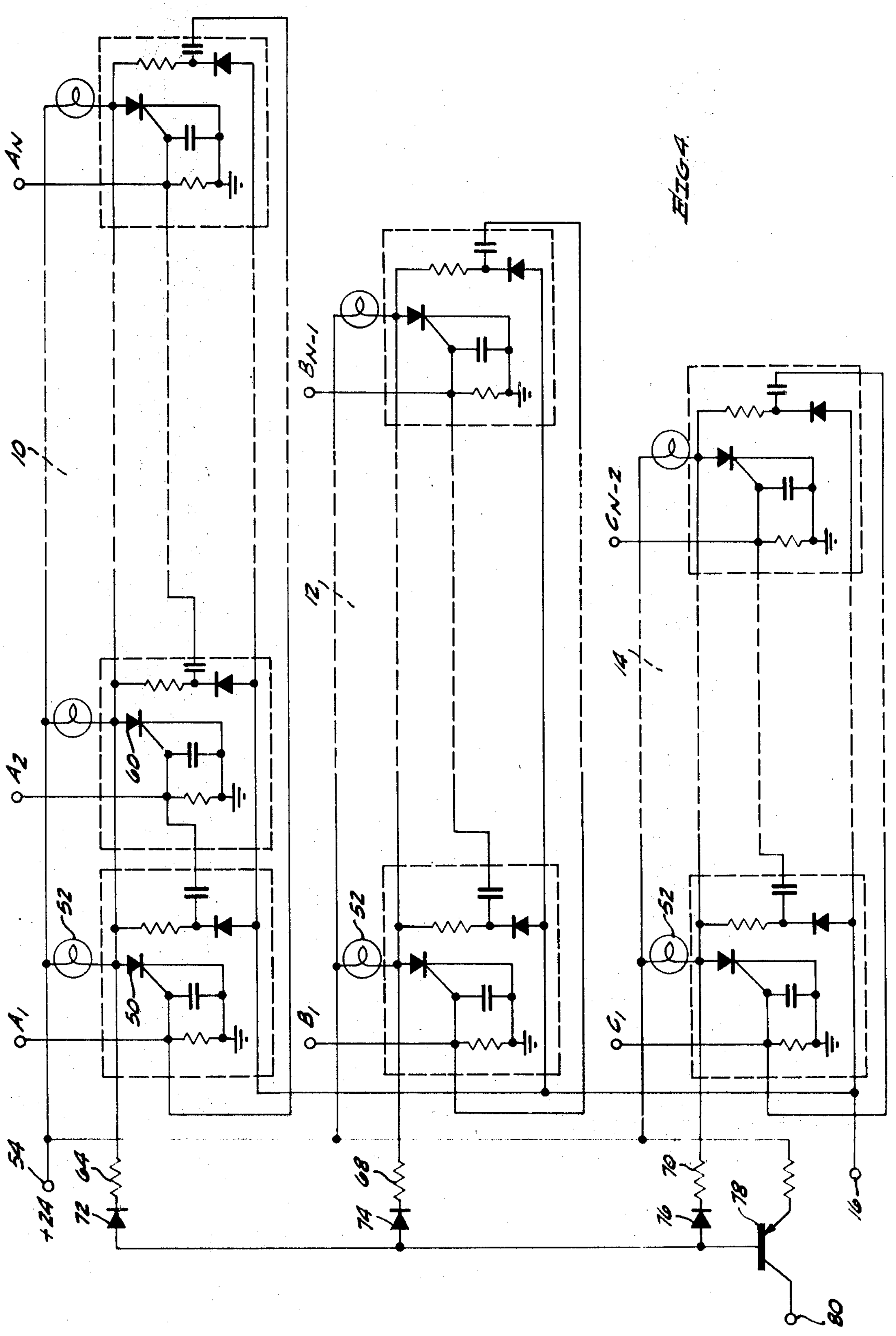
FIG. 4 is an electrical schematic diagram of typical counting circuit shown in FIG. 1.

FIG. 4 illustrates an electrical circuit diagram illustrating the ring counters shown in FIGS. 1 and 2. The input terminal 16 is coupled into the circuits and referenced in FIG. 4 as seq. in. Each stage A, B, and C, of the ring counters 10, 12 and 14 comprises an SCR diode 50 which is conducting when no stages are enabled. A lamp indicator 52 is coupled between a +24 voltage source 54 and the anodes of the SCR diodes 50. Thus, each stage that is conducted may be visually displayed by the lamps 52 being illuminated. Each sequenced impulse will switch the SCR diodes off and turn on a subsequent SCR diode 60, as shown in bit stage A2 of ring counter 10. When the SCR diodes 60 turn on, the adjacent SCR diode, in this case diode 50, will be turned off. The anodes of the SCR diodes 50 are coupled to respective resistors 64, 68, 70 and diodes 72, 74, 76, which make up an AND gate configuration. The anodes of the diodes 72, 74, and 76 are coupled into the base of a transistor 78 which has an output terminal on the collector 80 thereof which, when enabled, indicates a full register in the manner previously described.

Thus it can be seen that the principle of operation described herein may be applied in the form of electrical circuitry or of a mechanical structure using gears or similarly divided mechanisms to establish the N relationship between the multicades, and they may be applied electrically to stepping switches of different positions, or may be designed to utilize electronic means by means of transistors, integrated circuitry, or, as shown in FIG. 4, silicon controlled rectifiers.

Typical coincident counters of various N value multicades are given in the following example.

MULTICADE "n" VALUE

| A | B | C | D | E | Range |
|---|---|---|---|---|---|
| 3 | 4 | None | None | None | 12 |
| 3 | 4 | 5 | None | None | 60 |
| 3 | 4 | 5 | 7 | None | 420 |
| 3 | 4 | 5 | 7 | 11 | 4,620 |
| 3 | 5 | 7 | 11 | 13 | 15,015 |
| 7 | 11 | 13 | 17 | 19 | 323,323 |

When properly designed, the coincident counter of this invention can be somewhat more economical in part requirements than conventional decade sequential counters of similar range. For example, a decade sequential counter of the prior art with a range of 999,999 requires six decades of 10 bits each, totaling 60 bits plus the appropriate sequencing circuitry (5 stages). The following is an example of seven multicade coincident counters, as set forth in this invention, having no sequencing circuitry required and utilizing a total of 60 bits.

| A | B | C | D | E | F | G | Range |
|---|---|---|---|---|---|---|---|
| 3 | 4 | 5 | 7 | 11 | 13 | 17 | 1,021.020 |

A further advantage of the coincident counter of this invention over the decade sequential counters of the prior art, is one of propagation time. If in the example of the decade unit full register is to be noted as 00,000, then to get there from the position 999,999 an input pulse is applied to the units column which upon switching from 9 to 0 applies a second pulse into the 10 columns, so on until all columns reach zero. Since all multicades in the coincident counter of the present invention are operated simultaneously, they all shift to the coincident point, or full register, at the same time. This indicates that even though the coincident system has an additional column, its total propagation time is six times faster or one-sixth of the decade unit.

Since full register detectors can be made extremely sensitive and since the full register output may be operated through a simple AND gate, as shown in FIGS. 2 and 4, there is no definable limit to the range of a coincident counter, as set forth in this invention, below that of any other counting system.

Having thus described but one preferred embodiment of this invention, what is claimed is:

1. A coincident counting system having a changeable full count point, said system including:
   - an array of ring counters, each ring counter in said array having a plurality of bit stages, each ring counter having a dissimilar number of bit stages;
   - coincident gating means being adapted to be selectively coupled to a bit stage in each counter in said array for providing an output when the selected bit stages coupled to said coincident gating means are simultaneously enabled;
   - means coupled to said array for simultaneously incrementing each counter in said array; and
   - means coupled to said array of ring counters for selecting a predetermined bit stage in each counter of said array to be coupled to said coincident gating means for changing the full count point in said coincident counting systems.

2. The coincident counting system as defined in claim 1 wherein said coincident gating means being an AND gate.

3. A coincident counting system having a changeable full count point, said system including:
   - an array of ring counters, each ring counter in said array having a plurality of bit stages, each ring counter in said array having a dissimilar number of bit stages, each said counter being adapted to sequentially enable a succeeding bit stage following the bit stage already enabled upon enabling of the ring counter;
   - matrix means being coupled to said array of ring counters for enabling a selected bit stage in each counter in said array for determining the full count point in said coincident counting system, said matrix means including means for changing the full count point by changing the selected enabled bit stages in selected counters in said array;
   - coincident gating means being coupled to the selected bit stages in each counter in said array for providing an output when the selected bit stages which are coupled to the coincident gating means are simultaneously enabled; and
   - means coupled to said array for simultaneously incrementing each counter in said array and for enabling the selected bit stages starting with the next succeeding bit stages from the bit stages enabled in each counter by said matrix means.

4. The coincident counting system as defined in claim 3 wherein said coincident gating means being an AND gate.

5. A coincident counting system for counting a discrete number of events, said system including:

an array of ring counters, each ring counter in said array having a plurality of bit stages, each ring counter having a dissimilar number of bit stages;

coincident gating means being coupled to a selected bit stage in each counter in said array for providing an output when the selected bit stages coupled to said coincident gating means are simultaneously enabled;

a power supply;

a switch means coupled between said power supply and said array of ring counters for simultaneously incrementing all the counters in said array each time said switch is closed;

means for causing said events to close said switch means on the occurrence thereof;

means coupled to said gating means and said means for causing said events to close said switch means for stopping the occurrence of the events when an output is present on said gating means;

and further including means coupled to said array of ring counters for selecting a predetermined bit stage in each counter of said array to be coupled to said coincident gating means for changing the full count point in said coincident counting system.

6. The coincident counting system as defined in claim 5 wherein said coincident gating means being an AND gate.